(12) United States Patent
Tournier

(10) Patent No.: US 6,505,274 B2
(45) Date of Patent: *Jan. 7, 2003

(54) PROCESSOR AND SYSTEM FOR CONTROLLING SHARED ACCESS TO A MEMORY

(75) Inventor: Christian Tournier, Seyssinet-Pariset (FR)

(73) Assignee: STMicroelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,402

(22) Filed: Oct. 9, 1998

(65) Prior Publication Data

US 2001/0044884 A1 Nov. 22, 2001

(30) Foreign Application Priority Data

Oct. 9, 1997 (FR) .............................................. 97 12634

(51) Int. Cl.[7] .............................................. G06F 12/06
(52) U.S. Cl. ........................ 711/151; 711/158; 710/124; 710/117; 370/321
(58) Field of Search .................................. 711/150, 151, 711/118, 158, 154; 709/217; 710/124, 117; 370/229, 336, 335, 321

(56) References Cited

U.S. PATENT DOCUMENTS

| | | | |
|---|---|---|---|
| 4,181,933 A | | 1/1980 | Benysek |
| 4,313,161 A | | 1/1982 | Hardin et al. |
| 4,949,395 A | * | 8/1990 | Rydbeck ..................... 370/336 |
| 5,218,680 A | * | 6/1993 | Farrell et al. ............... 370/433 |
| 5,442,775 A | * | 8/1995 | Whitted, III et al. ........ 713/601 |
| 5,521,925 A | * | 5/1996 | Merakos et al. ............ 370/337 |
| 5,583,856 A | * | 12/1996 | Weir .......................... 370/359 |
| 5,586,264 A | * | 12/1996 | Belknap et al. ............. 711/118 |
| 5,602,836 A | * | 2/1997 | Papadopoulos et al. ..... 370/280 |
| 5,721,815 A | * | 2/1998 | Ottesen et al. .............. 345/327 |
| 5,737,747 A | * | 4/1998 | Vishlitzky et al. .......... 711/118 |
| 5,764,893 A | * | 6/1998 | Okamoto et al. ........... 711/150 |
| 5,815,662 A | * | 9/1998 | Ong ........................... 709/217 |
| 5,875,184 A | * | 2/1999 | Altvater et al. ............. 370/330 |
| 6,115,786 A | * | 9/2000 | Mizutani .................... 711/111 |
| 6,141,336 A | * | 10/2000 | Bauchot et al. ............. 370/348 |
| 6,298,370 B1 | * | 10/2001 | Tang et al. ................. 709/100 |

FOREIGN PATENT DOCUMENTS

| | | | |
|---|---|---|---|
| EP | 3313840 A1 | * | 10/1984 |
| EP | 0 185 348 A2 | * | 6/1986 |
| EP | 448927 A1 | * | 2/1991 |
| EP | 0709982 A1 | * | 5/1996 |
| JP | 61282954 | | 12/1986 |

OTHER PUBLICATIONS

"Dynamic Random Access Memory Refresh Method in Triple–Modular–Redundant System" IBM Technical Disclosure Bulletin., vol. 36, No. 7, Jul. 1993, New York US, pp. 7–12, XP000383584, p. 11. line 1; p. 12, line 4.
French Search Report (Jul. 10, 1998).

* cited by examiner

Primary Examiner—Matthew Kim
Assistant Examiner—Pierre-Michel Bataille
(74) Attorney, Agent, or Firm—Lisa K. Jorgenson; Stephen Bongini; Fleit, Kain, Gibbons, Gutman & Bongini P.L.

(57) ABSTRACT

Several peripheral entities are provided, with each peripheral entity being clocked by its own internal clock signal and being able to access a single-access memory. A priority entity is defined from among the peripheral entities, and the other peripheral entities are defined as auxiliary entities. A repetitive time frame is formulated, regulated by the internal clock signal of the priority entity, and subdivided into several groups of time windows that are allocated to the peripheral entities. One of the peripheral entities is a microprocessor that is disabled for a fixed duration after each memory access request.

16 Claims, 3 Drawing Sheets

PROCESSOR AND SYSTEM FOR CONTROLLING SHARED ACCESS TO A MEMORY

The present application is related to the inventor's application entitled "PROCESSOR AND SYSTEM FOR CONTROLLING SHARED ACCESS TO A MEMORY," Ser. No. 09/169,715, which was filed on the same day as the present application.

CROSS-REFERENCE TO RELATED APPLICATIONS

This application is based upon and claims priority from prior French patent application 97 12634, filed Oct. 9, 1997, the entire disclosure of which is herein incorporated by reference.

BACKGROUND OF THE INVENTION

1. Field of the Invention

The present invention relates to memory access control, and more specifically to the control of shared access to a memory by several entities that operate in an asynchronous manner.

2. Description of the Related Art

In conventional devices for application to the field of television, data to be displayed on a television screen is delivered by a screen controller that reads from a random access memory whose contents are the results of logic processing performed by a microprocessor. The clock signals that clock the screen controller and the microprocessor are fully asynchronous (in terms of frequency and phase) and each of these entities may request access to the memory at the same time. A conventional approach to shared access uses "dual-access" memories in which two entities can read from or write to (simultaneously or otherwise) each of the memory locations. Such an approach to shared memory access requires the use of complex memories and can cause problems or errors in certain cases. For example, a problem situation arises when one entity requests a write to a memory location while (almost simultaneously) the other entity wishes to read from the same location.

SUMMARY OF THE INVENTION

In view of these drawbacks, it is an object of the present invention to remove the above-mentioned drawbacks and to provide a time-shared, single-access memory, instead of a physically-shared dual-access memory. In the system, memory access requests are time-shared, and access to memory is managed by a sequencer that segments time into access windows. Each access window is reserved for one of the entities using the memory. Additionally, the sequencer is regulated by an internal clock signal of the highest priority entity. A non-priority (i.e., other or auxiliary) entity must wait for its next access window to read or store data. In this manner, control is accomplished for shared access to a memory by several peripheral entities, which are each clocked by an internal clock signal.

In this system, the priority given to a lower priority entity will cause delays in execution. These delays, within the context of fully asynchronous processes with different periods, are completely unpredictable and non-computable in a deterministic manner. Assuming that such a non-priority process also has real-time constraints, the priority scheme can compromise proper execution. In other words, the response time of the system will vary with respect to the auxiliary process. This is particularly detrimental when the auxiliary entity is a central processing unit that manages an RS-232 interface (i.e., because the bit rate of the interface may depart from the prescribed specifications due to the random accumulation of delays). Additionally, the response time of the system is variable and probabilistic, and this is injurious for a real-time application.

According to the present invention, in order to prevent the generation of random delays in the execution of data processing by the auxiliary processes, delays are "forced" to a maximum value that preferably corresponds to the potentially worst case. This causes the delay to become fixed, so that the memory behaves like a memory with a "slower" access time but with a completely deterministic response time.

In a first embodiment of the present invention, the memory is a single-access memory, and a priority entity is defined from among the peripheral entities. The other entities, at least one of which includes a central processing unit and an input/output circuit that can store data to be written to the memory (or data extracted from memory to be read by the central processing unit), are defined as auxiliary entities. A repetitive time frame is formulated, regulated by the internal clock signal of the priority entity, and subdivided into several groups of time windows that are allocated to the peripheral entities. When a memory access request signal is generated by the central processing unit during a window that is not allocated to the unit, the data in the input/output circuit is enabled during the next time window allocated to the central processing unit. The internal operation of the central processing unit is disabled until a predetermined time that is subsequent to the data enabling time and that is separated from the generation time of the access request signal by a predetermined duration (corresponding to a predetermined number of periods of the internal clock signal of the central processing unit). In one preferred embodiment directed to a television application, a screen controller is the priority entity and data samplers are included among the auxiliary entities. The predetermined duration can be fixed or modifiable by the central processing unit.

The present invention also provides a system for controlling shared access to a random access memory. The system includes a single-access random access memory connected to a data bus and an address bus, and several entities in the form of a priority entity and several auxiliary entities, each of which is clocked by its own internal clock signal. At least one of the auxiliary entities includes a central processing unit. Additionally, each peripheral entity can generate a memory access request signal and includes an input/output circuit connected to the data and address buses. The input/output circuit can store data extracted from or to be written to memory and has a control port for receiving at least one signal for enabling the stored data.

In one preferred embodiment, the system also includes a control interface having a sequencer regulated by the internal clock signal of the priority entity so as to formulate a repetitive time frame that is subdivided into several groups of time windows that are allocated to the peripheral entities. When an access request signal is generated by the central processing unit during a time window not allocated to the unit, a control circuit within the interface acts to deliver the data enabling signal to the input/output circuit of the peripheral entity during a window allocated to the peripheral entity. Further, when the access request signal is generated, an inhibiting circuit within the interface acts to disable the internal operation of the central processing unit until a predetermined time that is subsequent to the receiving of the data enabling signal and that is separated from the time of generation of the access request signal by a predetermined duration (e.g., corresponding to a predetermined number of periods of the internal clock signal of the central processing unit).

According to one embodiment, the inhibiting circuit includes a counter clocked by the internal clock signal of the central processing unit, a comparison circuit that compares the current value of the counter with the predetermined number, and a flip-flop linked to the output of the comparison circuit for delivering a signal for selectively disabling the internal operation of the central processing unit. The inhibiting circuit also includes a detection circuit for detecting transitions of the data enabling signal and an AND gate whose output is linked to the flip-flop and whose two inputs are linked to the outputs of the comparison circuit and the detection circuit. This "disabling" (or inhibiting) of the operation of the central processing unit may involve a complete interruption of the operation of the central processing unit or merely a disabling (or freezing) of the contents of the registers or internal flip-flops so that there is no change in the data delivered by these flip-flops until the disabling signal is deactivated.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
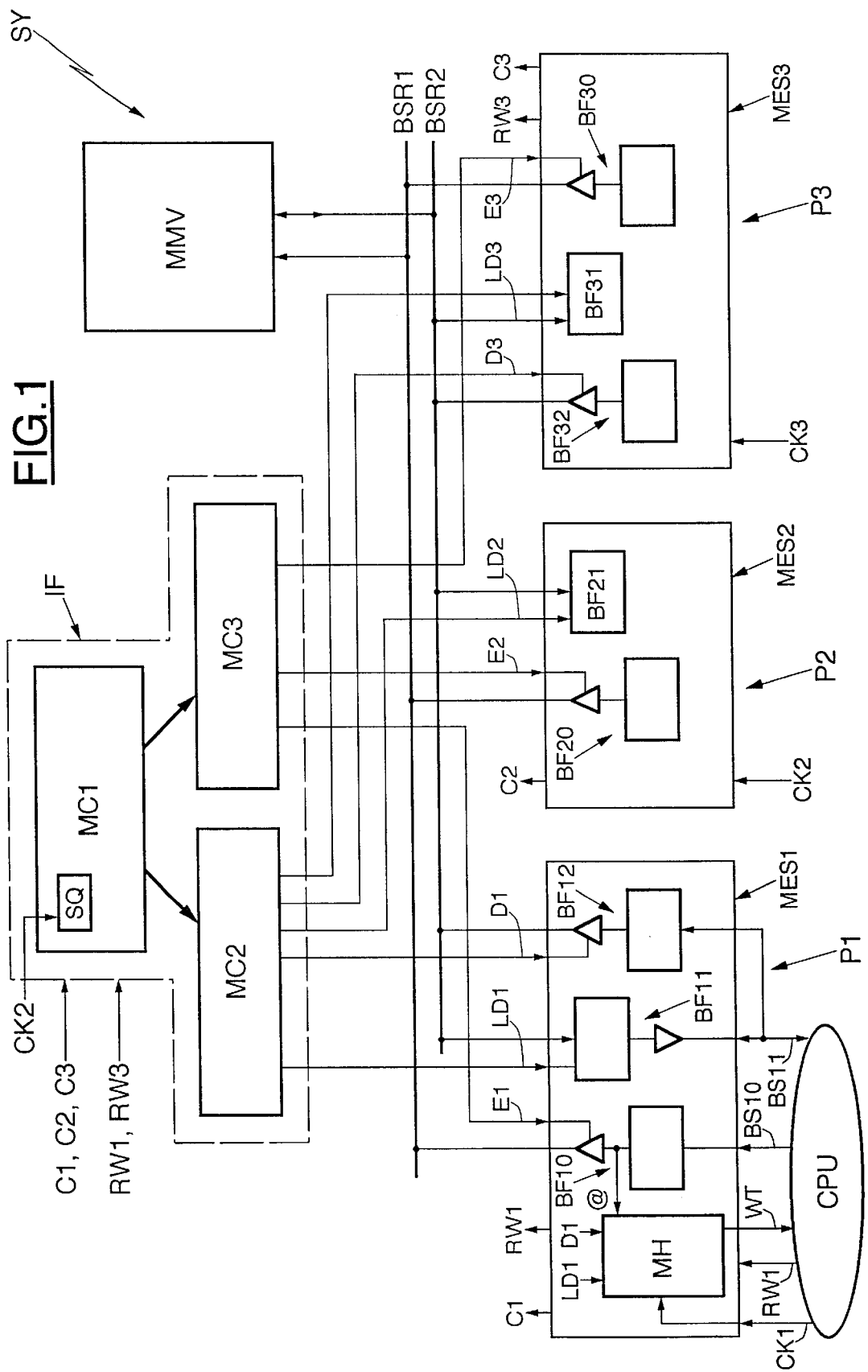
FIG. 1 is a block diagram of a system for controlling shared access to memory in accordance with a preferred embodiment of the present invention.

A system SY according to the preferred embodiment of the present invention allows control of access by three peripherals P1, P2, and P3 to a random access memory MMV. As shown in FIG. 1, a first one of the peripherals P1 includes a central processing unit CPU and an input/output circuit MES1, which is connected to an address bus BSR1 and a data bus BSR2 of the memory. The input/output circuit MES1 includes an output port BF10 connected to the address bus BSR1. The output port includes a buffer memory connected to the address bus BS10 of the central processing unit for storing an address, and is controlled in conventional manner by an address enabling signal E1 that enables the address on the address bus BSR1 of the memory.

Further, the input/output circuit MES1 includes a data input port BF11, which includes a buffer memory connected between the data bus BSR2 of the memory MV and the data bus BS11 of the central processing unit. The input port is controlled by a signal LD1 that enables data from the memory MMV. Similarly, to write data to the memory MMV, the circuit MES1 includes a data output port BF12 that is controlled by a data enabling signal D1 to allow writing of data to the memory MMV. The input/out circuit MES1 includes a control port for exchanging the various enabling signals E1, LD1, and D1, and for delivering a memory access request signal C1 and another signal RW1 representative of the read/write direction.

The second peripheral P2, which in the preferred television application is the screen controller, includes an input/output circuit MES2 having a control port and an output port BF20. The output port is connected to the address bus BSR1 of the memory, and includes an address pointer that is controlled by an address enabling signal E2. Furthermore, the input/output circuit MES2 includes a single data input port BF21 having a buffer memory that is connected to the data bus BSR2 of the memory and controlled by a data enabling signal LD2.

The input/output circuit MES3 of the third peripheral P3, which in the preferred embodiment is a data sampling device, similarly includes control and data ports BF31 and BF32 for reading and writing, respectively. These ports are controlled by enabling signals LD3 and D3, respectively. An address port BF30 is controlled by an enabling signal E3 and an address pointer.

The system SY also includes an interface IF for controlling and managing access to the memory MMV. The interface IF includes processing circuitry that can be realized (at least partially) in the form of software within a microcontroller, as an application specific integrated circuit (ASIC), or by hardware integration into the system (i.e., integrated circuit). As shown in FIG. 1, the interface IF is functionally broken down into a main controller MC1 (which includes a sequencer SQ regulated by the clock signal of one of the peripherals so as to formulate a repetitive time frame), a data bus controller MC2 (which delivers the data enabling signals LDi and/or Di), and an address bus controller MC3 (which delivers the address enabling signals Ei).

The formulation of the repetitive time frame TR (see FIG. 2) is dependent upon the priority given to the peripherals. More precisely, the peripheral (P1, P2, or P3) whose real-time processing is of the highest priority (e.g., the one having the most real-time constraints) is used to form the time frame TR. In the preferred television application, the priority real-time processing peripheral is defined as the one that manages the display screen in order to prevent the quality and stability of the image displayed from being impaired. Thus, the peripheral P2 (i.e., the screen controller) is designated as the priority entity, and the other peripherals are the auxiliary entities. Accordingly, the duration of the frame TR is chosen as the duration necessary to display a character on the screen and corresponds to a certain number of periods of the clock signal CK2 of the screen controller.

Figure 2:
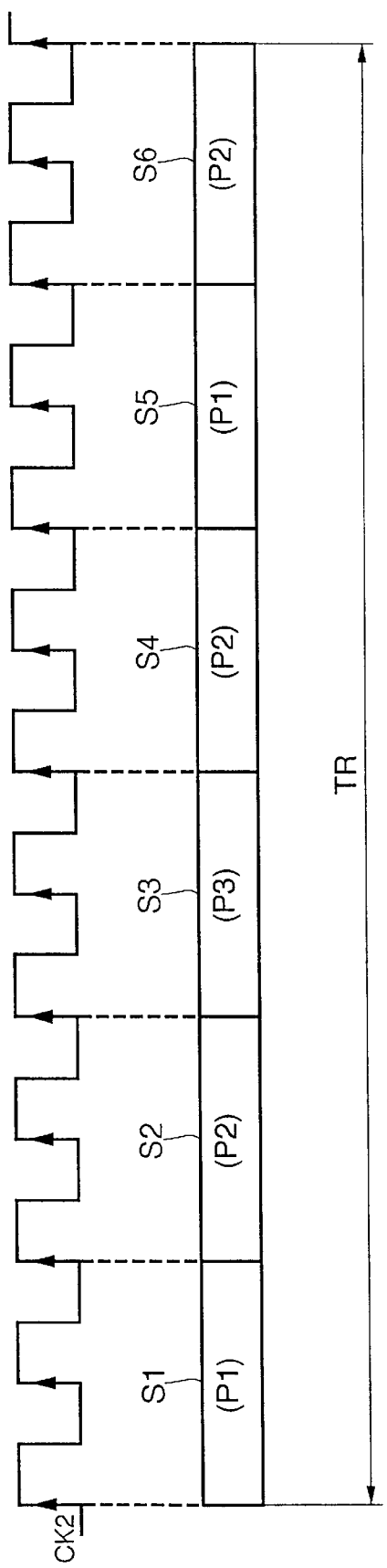
FIG. 2 illustrates a time frame for allowing time-shared access to memory.

For example, the number of clock periods in a frame is equal to 18 in the preferred embodiment, although for simplification only 12 have been represented in FIG. 2. It is assumed in this embodiment that the display processing necessitates three access to the memory, which are shown as time windows S2, S4, and S6 and each have a duration of two periods of the clock signal CK2. The remaining access windows (i.e., windows S1, S3, and S5) are reserved for the other peripherals. Here, the windows S1 and S5 are allocated to the central processing unit CPU, and the window S3 is allocated to the peripheral P3.

The sequencer of the control interface is regulated by the clock signal CK2 of the priority entity. Accordingly, the successive access requests C2 generated by the peripheral P2 will be synchronous with the occurrence of time windows S2, S4, and S6. The address enabling signals E2 and LD2 will therefore be delivered by the control circuitry MC2 and MC3 during these windows, thus permitting access by the peripheral P2 to the memory MMV. On the other hand, as far as the peripheral P3 is concerned, if an access request signal C3 is generated during a window that is not allocated to that peripheral (e.g., during window S1), the control interface delivers the address enabling signal E3 and the data enabling signal D3 or LD3 (depending on the value of a signal RW3) during the next access window allocated to the peripheral P3 (i.e., window S3). Thus, the peripheral P3 can only access the memory MMV during a window that is allocated to the peripheral. The same principle is applied to the peripheral P1 in the case where an access request signal C1, which is associated with a write or read request signal RW1, is generated by that peripheral during a window that is not allocated to the peripheral P1. Additionally, it is expedient to disable the internal operation of the central processing unit CPU until the enabling signal LD1 or D1 is received.

In this system, if the access request signal from the central processing unit is delivered at the start of the time window S6, the central processing unit must be disabled for two periods of the clock signal CK2. On the other hand, if the access request signal is delivered at the start of the window S2, the central processing unit must be disabled for six clock periods CK2 (or seven periods if the access request is generated within the second half of the time window S1). In contrast, if the access request signal is generated by the central processing unit at the start of the time window S1, the reception of the enabling signal LD1 or D1 occurs during that same time window. Consequently, the duration of the disabling of the central processing unit can be from non-existent to seven periods of the clock signal CK2.

In order to make this "disabling" duration uniform, its period is fixed at a predetermined value corresponding to the maximum foreseeable delay (here, seven periods of the clock signal CK2). In other words, regardless of the generation time of the access request signal by the central processing unit (i.e., whether or not within a window allocated to the central processing unit), the central processing unit is disabled for the predetermined disabling duration and the data enabling signals LD1 or D1 are delivered by the control interface during a time window that is allocated to the central processing unit and that falls within this disabling period.

Figure 3:
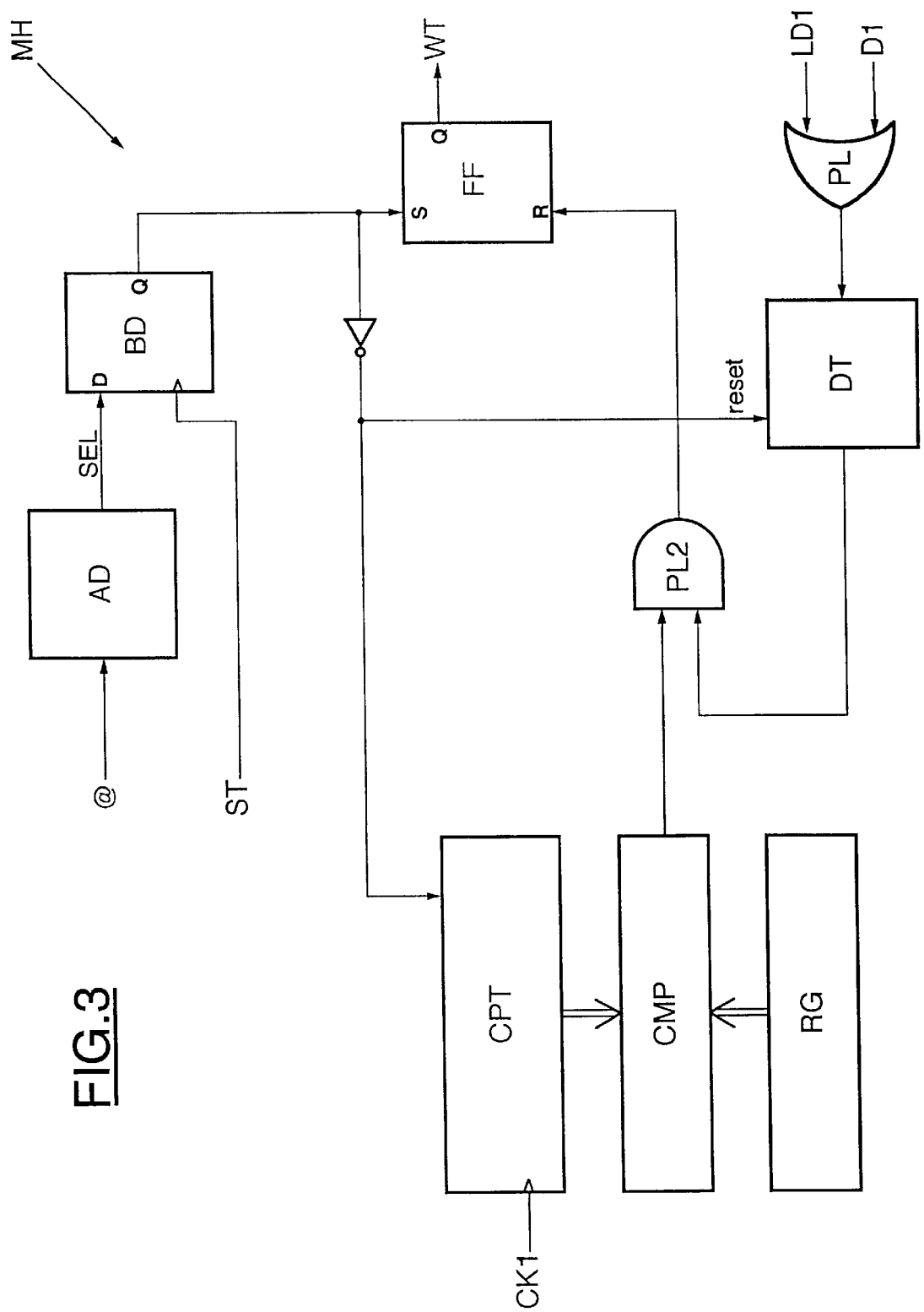
FIG. 3 is a detailed block diagram of essential portions of the system of FIG. 1.

For this reason, the control interface IF also includes an inhibiting circuit MH that is part of block MES1. More precisely, as illustrated in FIG. 3, the inhibiting circuit MH includes an address decoder AD that receives the address on the bus BS10 of the central processing unit and verifies that the address corresponds to an actual address of the memory. If so, the output signal SEL from the decoder goes to logic "1" and is stored in a flip-flop BD, which is controlled by the address enabling signal ST from the central processing unit. When the address enabling signal ST changes to "1", the output of the flip-flop BD causes the output of flip-flop FF to change to "1". This output signal WT, which is delivered to the central processing unit CPU, then acts as a signal for disabling the central processing unit. (It should also be noted that the changing of the signal WT from logic "0" to logic "1" can be used for generating the access request signal C1.)

The inhibiting circuit MH also includes a counter CPT that is clocked by the internal clock signal CK1 of the central processing unit and initialized by the inverted output signal of the flip-flop BD. A comparison circuit CMP is associated with the counter for comparing the current value of the counter with a predetermined number of periods of the auxiliary clock signal CK1 (i.e., a value corresponding to the predetermined disabling duration). In the preferred embodiment, the predetermined number of periods of the clock signal CK1 is stored in a register RG that can be software-modified by the central processing unit. The output of the comparator CMP is linked to one of the inputs of an AND gate PL2, whose output is linked to the reset input of the flip-flop FF. The inhibiting circuit MH also includes a transition detector DT whose output is linked to the other input of the AND gate PL2. The input of the detector DT is linked to the output of an OR gate PL, which receives the enabling signals LD1 and D1. The detector can be initialized by the inverted output signal of the flip-flop BD.

The generation by the controller MC2 of the data enabling signal LD1 or D1 (depending on read or write) causes an upward transition of the corresponding signal. When the signal WT changes to "1", the counter CPT and the detector DT are initialized. When the counter reaches the predetermined value stored in the register RG, the comparator CMP causes the input of the AND gate PL2 to go to "1". Because the data enabling signal LD1 or D1 should be delivered before the counter has reached its final count value, at this point the other input of the AND gate PL2 is also at "1". This resets the output of the flip-flop FF so as to cause the disabling signal WT to change back to the low state. The internal operation of the central processing unit CPU is then reactivated.

While the transition detector DT and the associated OR gate PL are not indispensable (because the final count value is chosen to be sufficiently high so that the comparator signal occurs after reception of the data enabling signal LD1 or D1), it is preferable to condition the resetting of the output of the flip-flop FF on the actual reception of the data enabling signal LD1 or D1. This is because the value contained in the register RG may be software-modifiable, and thus it is best to insure that the reactivation time of the internal operation of the central processing unit CPU cannot occur before the enabling of the data.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Furthermore, embodiments of the present invention may not include all of the features described above. Therefore, it is intended that the present invention not be limited to the particular embodiments disclosed, but that the invention include all embodiments falling within the scope of the appended claims.

What is claimed is:

1. A system for controlling shared access to a memory, said system comprising:

a memory connected to a data bus and an address bus;

a plurality of peripheral devices divided into a priority peripheral device and auxiliary peripheral devices, one of the auxiliary peripheral devices including a central processing unit and an input/output circuit, each peripheral device being clocked by its own internal clock signal and being able to generate a memory access request signal;

a sequencer that is regulated by the internal clock signal of the priority peripheral device so as to formulate a repetitive time frame; and a control circuit that is coupled to the peripheral devices, the control circuit including an enabling circuit and an inhibiting circuit, wherein the time frame is subdivided into a plurality of groups of time windows, each group of time windows is allocated to one of the peripheral devices, when a memory access request signal is generated by the one auxiliary peripheral device during a time window not allocated to the one auxiliary peripheral device, the enabling circuit delivers an enabling signal to the one auxiliary peripheral device during a time window within the group of time windows allocated to the one auxiliary peripheral device, and the inhibiting circuit disables the internal operation of the central processing unit of the one auxiliary peripheral device until a predetermined time that is subsequent to the time when the enabling circuit delivers the enabling signal to the one auxiliary peripheral device, and the inhibiting circuit includes:
    a counter clocked by the internal clock signal of the one auxiliary peripheral device;
    a comparison circuit that compares the value of the counter with a predetermined number; and
    a flip-flop coupled to the comparison circuit, the flip-flop outputting a signal that selectively disables the internal operation of the central processing unit of the one auxiliary peripheral device.

2. The system as defined in claim 1, wherein the inhibiting circuit further includes:
    a detection circuit for detecting transitions of the enabling signal; and
    an AND gate having an output coupled to the flip-flop and inputs coupled to the outputs of the comparison circuit and the detection circuit.

3. The system as defined in claim 1, wherein the predetermined time is separated from the generation time of the memory access request signal by a predetermined duration.

4. The system as defined in claim 3, wherein predetermined duration corresponds to a predetermined number of periods of the internal clock signal of the one auxiliary peripheral device including the central processing unit.

5. The system as defined in claim 4, wherein the memory is a single-access memory.

6. The system as defined in claim 4, wherein the memory is a random access memory.

7. A method for controlling shared access to a memory by a plurality of peripheral devices, each peripheral device being clocked by its own internal clock signal, said method comprising the steps of:
    defining one of the peripheral devices as a priority peripheral device, and defining the other peripheral devices as auxiliary peripheral devices, one of the auxiliary peripheral devices including:
        a central processing unit; and
        an input/output circuit that is coupled to the memory and that can store data to be written to or extracted from the memory;
    formulating a repetitive time frame that is regulated by the internal clock signal of the priority peripheral device;
    subdividing the time frame into time windows and grouping the time windows so as to form several groups of time windows;
    permanently allocating each group of time windows to one of the peripheral devices; and
    when a memory access request signal is generated by the central processing unit of the one auxiliary peripheral device during a time window that is not allocated to the one auxiliary peripheral device, enabling data in the input/output circuit of the one auxiliary peripheral device during the next time window allocated to the one auxiliary peripheral device, and disabling the internal operation of the central processing unit of the one auxiliary peripheral device until a predetermined time that is subsequent to the time when the data in the input/output circuit of the one auxiliary peripheral device is enabled, wherein the internal operation of the central processing unit of the one auxiliary peripheral device is disabled by a sub-process comprising the steps of:
    operating a counter based on the internal clock signal of the one auxiliary peripheral device;
    comparing the value of the counter with a predetermined number; and
    outputting a disabling signal based on the comparison to selectively disable the internal operation of the central processing unit of the one auxiliary peripheral device.

8. The method as defined in claim 7, wherein the predetermined time is separated from the generation time of the memory access request signal by a predetermined duration.

9. The method as defined in claim 8, wherein predetermined duration corresponds to a predetermined number of periods of the internal clock signal of the one auxiliary peripheral device including the central processing unit.

10. The method as defined in claim 8, wherein the predetermined duration is a fixed duration.

11. The method as defined in claim 8, wherein the central processing unit can modify the predetermined duration.

12. The method as defined in claim 8, wherein the memory is a single-access memory.

13. The method as defined in claim 8, wherein the memory is a random access memory.

14. A method for controlling shared access to a memory by a priority peripheral device and a plurality of auxiliary peripheral devices, the priority peripheral device being clocked by a first clock signal and one of the auxiliary peripheral devices being clocked by a second clock signal, the one auxiliary peripheral device including a central processing unit and an input/output circuit, said method comprising the steps of:
    formulating a repetitive time frame that is regulated by the first clock signal;
    subdividing the time frame into time windows and grouping the time windows so as to form several groups of time windows;
    permanently allocating the time windows in a first of the groups of time windows to the one auxiliary peripheral device and allowing the one auxiliary peripheral device to access the memory only during the time windows in the first of the groups of time windows; and
    when a memory access request signal is generated by the central processing unit of the one auxiliary peripheral device during a time window that is not in the first group of time windows, enabling data in the input/output circuit of the one auxiliary peripheral device during the next time window in the first group of time windows, and disabling the internal operation of the central processing unit of the one auxiliary peripheral device until a predetermined time that is subsequent to the time when the data in the input/output circuit of the one auxiliary peripheral device is enabled, wherein the internal operation of the central processing unit of the one auxiliary peripheral device is disabled by a sub-process comprising the steps of:

operating a counter based on the second clock signal of the one auxiliary peripheral device;

comparing the value of the counter with a predetermined number; and outputting a disabling signal based on the comparison to selectively disable the internal operation of the central processing unit of the one auxiliary peripheral device.

15. The method as defined in claim 14, wherein the predetermined time is separated from the generation time of the memory access request signal by a predetermined duration.

16. The method as defined in claim 15, wherein predetermined duration corresponds to a predetermined number of periods of the second clock signal.

* * * * *